United States Patent
Theobald (10) Patent No.: US 9,440,361 B1
(45) Date of Patent: Sep. 13, 2016

(54) ACTIVATION ELEMENT AND METHOD (71) Applicant: Daniel Theobald, Somerville, MA (US)

(72) Inventor: Daniel Theobald, Somerville, MA (US)

( * ) Notice: Subject to any disclaimer, the term of this patent is extended or adjusted under 35 U.S.C. 154(b) by 0 days.

(21) Appl. No.: 13/929,943

(22) Filed: Jun. 28, 2013

(51) Int. Cl.
*B25J 17/00* (2006.01)
*B25J 17/02* (2006.01)
*B25J 18/00* (2006.01)
*B25J 9/10* (2006.01)

(52) U.S. Cl.
CPC .............. *B25J 17/00* (2013.01); *B25J 9/1075* (2013.01)

(58) Field of Classification Search
CPC .. F15B 15/103; F15B 15/1404; F15B 11/20; F15B 2211/78; B25J 9/142; B25J 9/1075
USPC .............. 74/490.01, 490.02, 490.03, 490.04, 74/490.05, 490.06; 92/92
See application file for complete search history.

(56) References Cited

U.S. PATENT DOCUMENTS

| | | | | |
|---|---|---|---|---|
| 2,642,091 A | * | 6/1953 | Morin | 92/90 |
| 3,645,173 A | * | 2/1972 | Yarlott | 92/92 |
| 4,615,260 A | * | 10/1986 | Takagi et al. | 92/92 |
| 4,733,603 A | * | 3/1988 | Kukolj | 92/92 |
| 4,739,692 A | * | 4/1988 | Wassam et al. | 91/36 |
| 4,841,845 A | * | 6/1989 | Beullens | 92/92 |
| 5,040,626 A | | 8/1991 | Paynter | |
| 5,046,375 A | * | 9/1991 | Salisbury, Jr. | B25J 9/046 414/7 |
| 5,080,000 A | | 1/1992 | Bubic | |
| 5,218,280 A | * | 6/1993 | Edwards | 318/567 |
| 5,351,602 A | * | 10/1994 | Monroe | 92/64 |
| 5,529,293 A | | 6/1996 | Haugs | |
| 6,168,634 B1 | * | 1/2001 | Schmitz | 623/24 |
| 6,223,648 B1 | * | 5/2001 | Erickson | 92/92 |
| 6,532,400 B1 | * | 3/2003 | Jacobs | 700/245 |
| 6,868,773 B2 | * | 3/2005 | Davis et al. | 92/92 |
| 6,896,704 B1 | * | 5/2005 | Higuchi | A61F 2/583 623/25 |
| 7,104,182 B2 | | 9/2006 | Reininger | |
| 7,331,273 B2 | | 2/2008 | Kerekes | |
| 7,837,144 B2 | | 11/2010 | Kothera | |
| 2002/0083828 A1 | * | 7/2002 | Bernier | 92/92 |
| 2002/0157322 A1 | | 10/2002 | Pedretti | |
| 2002/0157388 A1 | | 10/2002 | Seto | |
| 2005/0028237 A1 | * | 2/2005 | Greenhill et al. | 901/22 |
| 2009/0173223 A1 | | 7/2009 | Kudawara | |
| 2011/0023474 A1 | | 2/2011 | Kudawara | |

* cited by examiner

*Primary Examiner* — William Kelleher
*Assistant Examiner* — Jake Cook
(74) *Attorney, Agent, or Firm* — Albert J. Brunett (57) ABSTRACT

An apparatus has a first member and a second member that is movable relative to the first member. The apparatus also has an activation element connected to the first member. The activation element also is wrapped about at least a portion of the second member.

18 Claims, 6 Drawing Sheets

| Property | Human Muscle | Hydraulics |
|---|---|---|
| Max. Strain ($L/L_0$) | 30-70% | 10-100% |
| Max. Stress (MPa) | .1-.4 | 20-70 |
| Power Density (W/m$^3$) | $5 \times 10^5$ | $5 \times 10^8$ |
| Density (kg/m$^3$) | 1000-1100 | 1600-2000 |
| Efficiency | 20-25% | 90-98% |
| Activation Frequency (s$^{-1}$) | 5 - 500 | 5 - 300 |
| Control Resolution | $10^{-4}$-$10^{-2}$ | $10^{-5}$-$10^{-4}$ |

ACTIVATION ELEMENT AND METHOD

FIELD OF THE INVENTION

The present invention relates generally to actuators and, in at least one embodiment, to such actuators that are hydraulic or fluid powered and/or used to control stiffness.

BACKGROUND OF THE INVENTION

Actuators typically are mechanical devices that are used for moving or controlling a mechanism, system or the like and typically convert energy into some type of motion. Examples of actuators can be found in any number of applications encountered in everyday life including automotive, aviation, construction, farming, factories, robots, health care and prosthetics, among other areas.

Mobile robotics and advanced prosthetics will likely play important roles in the future of the human race. Actuators frequently are used in these applications that enable movement of a robot or user arm or other appendage or item as desired.

Most existing mobile robots and advanced prosthetics, however, lack the strength and speed necessary to be effective. This is because they suffer from poor specific power (strength×speed/weight) which determines how quickly work can be done compared to another actuator of the same weight.

For example, if such devices are capable of lifting significant weight, they must do so very slowly, which inhibits their adoption for most applications. On the other hand, devices that can move more quickly are just not capable of handling anything more than the smallest weight.

Hydraulic and pneumatic power systems can be used with such actuators, among other power systems. Pneumatic power systems, however, have a relatively low operating pressure, which limits the amount of force they can impart and exhibit poor controllability due to the compressible nature of air, among other drawbacks.

Additionally, conventional hydraulics technology suffers from poor efficiency, noisy operation, high cost and maintenance challenges among other problems. These and other problems inhibit the use of hydraulics in many applications.

SUMMARY OF THE INVENTION

In accordance with one embodiment of the invention, an apparatus has a first member and a second member that is movable relative to the first member. The apparatus also has an activation element connected to the first member. The activation element is wrapped about at least a portion of the second member.

BRIEF DESCRIPTION OF THE DRAWINGS

The following detailed description will be better understood when read in conjunction with the appended drawings in which there is shown one or more of the multiple embodiments of the present disclosure. It should be understood, however, that the various embodiments of the present disclosure are not limited to the precise arrangements and instrumentalities shown in the drawings.

FIG. 4 is a partial cross-sectional view of one embodiment of the present invention illustrating a plurality of activation elements enclosed in an outer sheath member or the like;

DETAILED DESCRIPTION OF THE INVENTION

Various embodiments of the present invention are described below with reference to the accompanying drawings. It should be understood that the following description is intended to describe exemplary embodiments of the invention, and not to limit the invention.

It is understood that the present invention is not limited to the particular components, analysis techniques, etc. described herein, as these may vary. It is also to be understood that the terminology used herein is used for the purpose of describing particular embodiments only, and is not intended to limit the scope of the present invention. It must be noted that as used herein, the singular forms "a," "an," and "the" include plural reference unless the context clearly dictates otherwise. The invention described herein is intended to describe one or more preferred embodiments for implementing the invention shown and described in the accompanying figures.

Unless defined otherwise, all technical and scientific terms used herein have the same meanings as commonly understood by one of ordinary skill in the art to which this invention belongs. Preferred methods, system components, and materials are described, although any methods and materials similar or equivalent to those described herein can be used in the practice or testing of the present invention.

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention. The scope of the present invention is defined by the claims, which includes known equivalents and unforeseeable equivalents at the time of filing of this application Various embodiments of the present invention are directed to various devices that are fluid powered, such as by hydraulics or pneumatics, for example. It is to be understood, however, that some embodiments of the present invention are not limited to these two specific technologies.

In operating a robot, advanced prosthetic, or some other item or mechanism, some type of power system typically is provided to enable particular movement, such as moving an arm or other appendage, for example. As readily can be discerned, in order to provide at least up and down movement to an arm member or the like some type of mechanical or other actuator typically is employed.

In a simple example, a piston driven actuator may be implemented to accomplish this movement. By moving the piston back and forth within a cylinder, the piston rod provides the basic movement to the arm member connected at is distal end.

Another type of actuator can be one that mimics the motion of a real biological muscle in the body of a human or other animal. These artificial or mechanical muscles typically provide some type of expandable member or tube connected at one end to an arm member, such as a forearm of a robot, for example, and at the other end to another member such as the upper arm or shoulder of a robot, for example.

Briefly, in operation, when such a member is expanded in a direction substantially perpendicular to its longitudinal centerline, it essentially contracts the member thereby drawing the arm closer to the shoulder. When the member is thereafter allowed to expand in a direction substantially parallel to its longitudinal centerline, it essentially extends the member and the arm moves away from the shoulder.

One example of such a mechanical muscle is known as a McKibbons style actuator. It is to be understood, however, that the particular type of mechanical muscle and corresponding expanding member can vary without departing from the teachings of various embodiments of the present invention.

These types of actuators or mechanical muscles exhibit a specific power (strength×speed/weight) that far exceeds that of existing actuators typically used in robots that suffer from poor efficiency, noisy operation, high cost and maintenance challenges, among other drawbacks. These drawbacks and more are readily solved by the design of illustrative embodiments of the present invention that readily exceed the performance of real biological muscles.

Additionally, as the human race begins to work in close collaboration with robots, advanced prosthetics, and similar machines and mechanisms, they are anticipated to expect the robots to be stronger, faster, have better endurance, be more precise, and cost less than other options. They also may expect robots to quickly and efficiently carry out their assigned physical tasks with little or no down time for maintenance or fatigue, for example.

Biological muscles consist of many smaller "actuator" fibers called sarcomeres, bundled in parallel. During movement of a body limb, for example, all or just a partial subset of available fibers may be activated depending on the task involved.

By scaling down the size of mechanical muscles, arranging them in bundles and designing them to handle much higher hydraulic pressures, a large increase in specific power is achieved. Significant reduction in the overall weight of this design, among other factors, leads to this increase in specific power. At the same time, by activating any number of the actuators arranged in such a bundle to vary the power output for the task at hand, significant power savings is achieved.

When employing these types of mechanical or artificial muscles, the trend is to provide a single actuator for each direction of desired motion. With this design, variations in movement and control are limited.

One key feature among many of illustrative embodiments is to provide a plurality of discrete, readily interchangeable mechanical muscles for each direction of desired motion, where each muscle has a predetermine power capability. This concept dramatically teaches away from conventional thinking, provides a number of distinct and unexpected results and advantages in the art, and essentially revolutionizes the potential applications possible.

As one example, by using a plurality or bundle of muscles, the number of muscles activated can vary depending on the power requirements of the task at hand. One advantage of this novel design concept is power conservation, which is particularly important with mobile robots as well with overall environmental concerns.

Another advantage is in the type and number of potential applications that become available by using a bundle of muscles. With conventional thinking being to merely increase the size of the actuator or muscle to increase the power capability of the device, applications are limited to larger and larger devices. In the design discussed herein, smaller and smaller applications are possible since the actuators can be smaller and lighter, among other attributes.

Examples of various hydraulic systems and robotic applications where a mechanical muscle may be employed can be found, for example, in applicant's issued U.S. Pat. No. 7,348,747 filed Mar. 30, 2006, issued U.S. Pat. No. 7,719,222 filed Mar. 24, 2008 and pending U.S. patent application Ser. No. 12/731,270 entitled "Task Flexibility for Actuators" filed Mar. 25, 2010 and related co-pending applications, all of the disclosures of which are hereby incorporated by reference. It is to be understood, however, that the particular details of the hydraulic system itself, as well as the robot, vehicle, tool, heavy equipment, actuator, or other apparatus, can vary without departing from the teachings of various embodiments of the invention.

Figure 1:
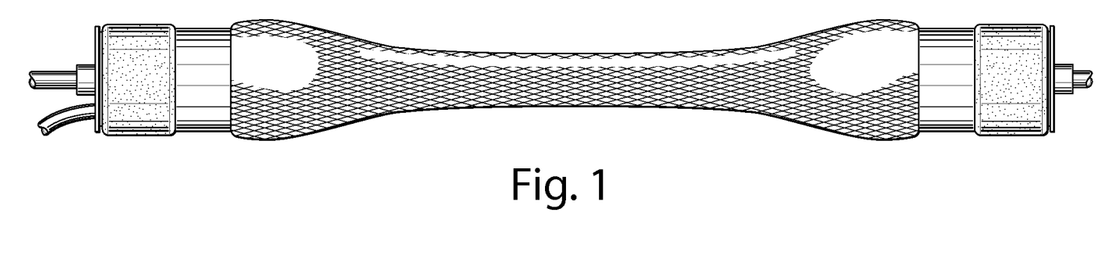
FIG. 1 is a plan view of one embodiment of an activation element of the present invention that may be utilized with the actuator of the present invention illustrated in a first "at rest" position.
Figure 2:
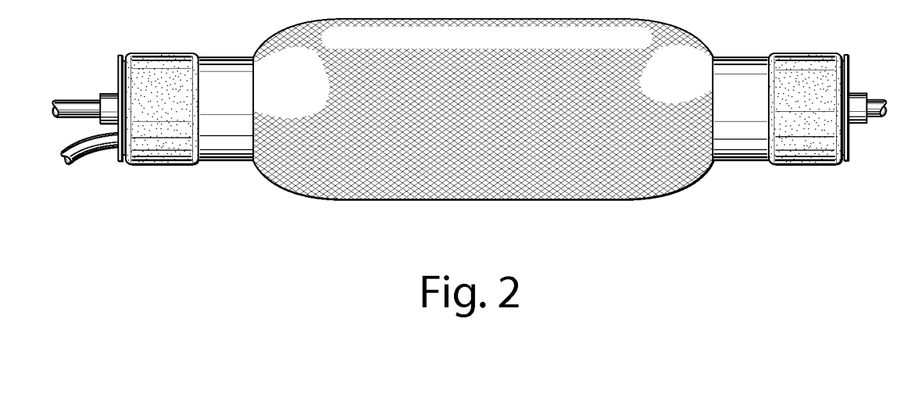
FIG. 2 is a plan view of the element of FIG. 1 illustrated in a second activated position.

FIGS. 1 and 2 generally illustrate one embodiment of a mechanical muscle 10 (i.e., an activation element) that may be employed in various embodiments of the present invention. The particular size, shape, material and design of the muscle 10 can vary so long as it falls within the scope of the appended claims.

Briefly, in operation, FIG. 1 generally illustrates the muscle 10 in an extended or at-rest position where no fluid is provided to the interior of the muscle 10. As FIG. 2 generally illustrates, when fluid is provided to the interior of the muscle 10, the muscle 10 expands in a direction substantially perpendicular to its longitudinal centerline, essentially contracting the muscle 10, thereby shortening it length. Conversely, when fluid is essentially released from the interior of the muscle 10, the muscle 10 expands in a direction substantially parallel to its longitudinal centerline, thereby increasing its length.

As readily can be discerned and described in more detail below, if the muscle 10 is attached on opposite ends to other members, desired movement between the members can be achieved. Additionally, the particular type, shape, material and design of the muscle 10 can be varied to in turn vary the movement between the two members to which it is attached.

Figure 3:
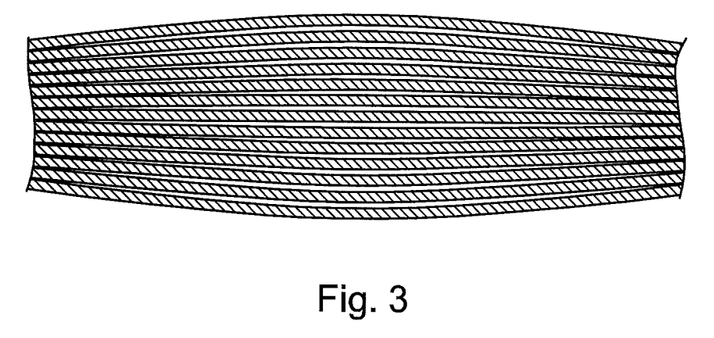
FIG. 3 is a partial plan view of one embodiment of the present invention illustrating a plurality of activation elements arranged in a bundle.

As FIG. 3 generally illustrates, the number of muscles 10 utilized can be expanded to vary the performance of the muscle 10 as needed. In particular, by providing a number of muscles 10 in one or more bundles 12 a corresponding increase in the lifting or movement capacity of the muscle 10 or bundle 12 can be accomplished.

Existing actuators for robot, prosthetics, and the like are heavy and lack the specific power necessary for effective designs. This limits the number, strength, and speed of each degree of freedom in a robot or the like.

While the human body has over 600 individual skeletal muscles, the most advanced humanoid robots in existence today can afford only 50 or so conventional actuators and still end up weighing twice as much as a human, which can present a safety issue when working closely with humans. To be truly capable and safe, robots and prosthetics need to be stronger, weigh less, and have many more degrees of freedom than current systems.

Pneumatic actuators or mechanical muscles are limited by their relatively low operating pressure of about 100 PSI and poor controllability due to the compressible nature of air, which is generally the working fluid in such pneumatic systems. By utilizing a design incorporating hydraulically actuated actuators or mechanical muscles as described herein that are capable of operating at much higher pressures of about 3000 PSI, incredible increases in power are provided while increasing controllability.

As the goal of robotics aims to supplant human labor, human skeletal muscle is an appropriate standard to beat. Muscles provide adaptive, integrated closed-loop positional control; energy absorption and storage; and elastic strain to allow for deformation of tissue under loads. They are rapidly responsive and able to adjust spring and damping functions for stiffness and compliance in stability, braking, and more. A viable artificial actuation approach should at least provide such comprehensive functionality; additionally such an approach should meet or exceed the set of performance metrics of human muscles and improve upon muscles' limited peak performance envelope.

Figure 6:
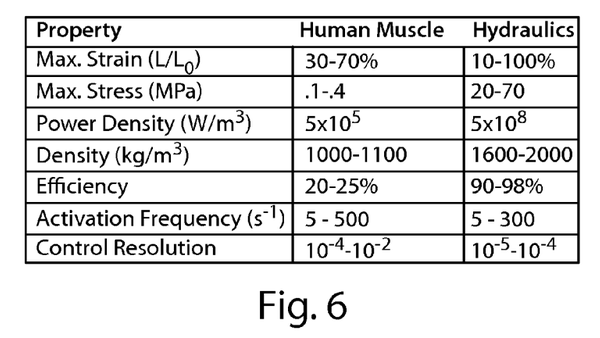
FIG. 6 is a table illustrating performance characteristics of human muscles and hydraulic systems.

As FIG. 6 illustrates, hydraulic mechanical muscles 10 outperform human muscle in power density, efficiency, stress vs. strain, frequency, control resolution, and will closely match human muscle in density, and variable compliance ability. In addition, hydraulic mechanical muscles will also achieve significant improvements in the state of the art in terms of cost, manufacturability, flexibility in application, and scalability. As described earlier, the power density factor is an important criterion that implies the simultaneous speed and strength needed for things like running and throwing.

While existing so me what exotic actuator technologies may exceed any single actuator performance metric, they are unable to provide comparable overall performance. For example, piezoelectrics are unacceptably brittle; shape memory alloys (SMAs) have prohibitively slow response cycles due to a temperature-dependent actuation; magnetostrictors require constant, fragile magnetic fields at large scales.

Additionally, electroactive polymers (EAPs), require large and potentially unsafe actuation voltages (>1 kV, typical) and consistent current to maintain displacement, possibly making them unacceptably inefficient while chemically-activated ionic versions do not consistently sustain DC-induced displacement and have slow response times. Additionally, EAPs have difficulty damping for low frequency vibration and inaccurate position sensing capabilities due to inherent actuator flexibility. Since biological joints are analogous to direct-drive actuation and therefore largely backdrivable (i.e. resilient), the same forces acting upon an EAP actuator in a leg for example will cause it to deform and perform unexpectedly. Most of all, these materials are prohibitively expensive and complicated to manufacture.

More conventional existing actuators fail to replicate muscle-like performance for a number of reasons. Electromagnetic approaches lack any real scalability because of their need for expensive, high power, rare-earth magnets. Their highly specialized motor design precludes the force output properties of muscle tissue.

Out of all available actuation techniques, pneumatic actuators, particularly of the "mechanical muscle" or McKibbens type described above appear to most closely match the force-velocity and force-length characteristics of human muscle. These pneumatic actuators exploit the high power density, light weight, and simplicity of fluid power, but precise control of these systems is difficult because of the compressibility of air and the inherent excessive compliance, hysteresis, nonlinearity, and insufficient contraction rates of rubber actuators.

In contrast, a hydraulic approach to mechanic al muscle fluid power avoids these limitations while at the same time offering inherent advantages for adjustable compliance, proportional force output, energy recovery and efficiency, precise control, and scalability. This broad complement of properties makes hydraulics an excellent candidate for biometric actuation.

In fact, the overall superior performance of hydraulics for vibration damping, actuation frequency, and volumetric power for compact designs in general applications are well known. Furthermore, since hydraulics operate on virtually the same principles as pneumatics, which perform comparably to natural muscle, they are similarly suitable for artificial muscles if used in the right actuator design. As such, a new paradigm in actuator approach is provided in at least one embodiment of the present invention that leverages the superior power and controllability of hydraulics with biophysical principles of movement.

One of the many significant benefits of a bundle of mechanical muscles approach is that simultaneous activation of all of the bundled actuators becomes unnecessary; rather, there is the potential to activate only the minimum of muscle fibers or actuators that are needed for the task. Benchtop tests demonstrated a 3 inch displacement for a strain of 70%. Maximum pulling force (before material failure) was approximately 95 pounds at a pressure of nearly 1800 PSI. This bundle approach to mechanical muscles will achieve at least 10 times the specific power of human muscle while achieving similar impedance control, and will be practical for use in robotic systems. As this type of system is perfected, additional increases in specific power are anticipated.

Human muscle is comprised of both pennate (fibers aligned at an angle to the muscle's long axis) and parallel-fibred muscles, each with functionally-specific mechanical features: pennate muscles act around joints, rotating their angle to act as variable gears, while parallel-fibered muscles are the workhorses (cf. biceps brachii or soleus) of load-bearing movement. The mechanical advantage of a bundle of small or miniature McKibbons type actuators is similar: since Pascal's Law holds that increases in fluid pressure are distributed equally to all parts of a system, force increases proportionally with the cross-sectional area of the actuator. Since it has been identified that adjustable force output can be a function of increased actuator diameter, using bundles or clusters of miniature McKibbons type actuators can scale upward in cross-sectional area through the addition of more actuators; since the individual actuator size does not increase, tolerances for pressure and stress remain the same while force output increases.

In a cylindrical pressure vessel, like a McKibbons Actuator, the effect of hoop stress from fluid pressure dominates the tensile stress in the individual fibers. It is established that $$T = \frac{PDd}{2\sin(\theta)} \quad (1)$$

where P, D, d, and $\theta$ are the fluid pressure, actuator tube inner diameter, fiber diameter, and weave angle respectively. As expected, the hoop stress, and therefore the tension, increase as a function of actuator diameter. The relationship for the peak contractile force (F) of a McKibbons style actuator can be expressed as:

$$F = \frac{\pi}{4} D_o^2 P \frac{1}{\sin^2(\theta)} (3\cos^2(\theta_0) - 1) \quad (2)$$

where $\theta_o$ and $D_o$ represent the weave angle and diameter of the actuator while at rest. For a given fiber, with diameter d and max tensile stress $\sigma_t$, and initial weave angle $\theta_o$ we can use Eqns. (1) and (2) to determine the maximum allowable fluid pressure as a function of diameter $D_o$.

$$T_{max} = \frac{\pi}{4} \sigma_t d^2 \quad (3)$$

$$P_{max} = T_{max} \frac{\sin(\theta_o)}{2Dd} \quad (4)$$

Substituting $P_{max}$ into (2) allows for calculation of the peak contractile force $F_{max}$ as a function of diameter. Here, we consider the bundle of McKibbons actuator or BoMA approach where a single, large actuator can be replaced with multiple smaller actuators. By using smaller cylinders, a significantly higher fluid pressure can be used. Let t be the thickness of the actuator tube and fibers, so that the outer diameter of the actuator is D+t. Then, we can calculate the peak contractile stress as, $$\sigma_{max} = \frac{4F_{max}}{\pi(D+t)^2} \quad (5)$$

Figure 7:
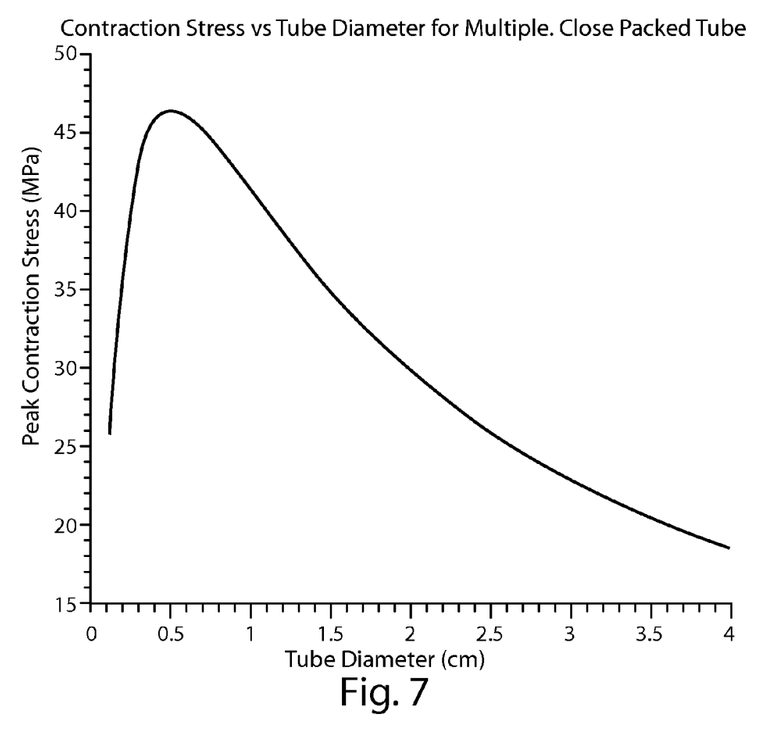
FIG. 7 is a graph illustrating contraction stress vs. tube diameter.

Using sample system parameters for $\theta$, d, and t, and the tensile strength for high strength polyethylene, FIG. 7 shows the peak contraction stress over a range of possible tube diameters. Note the peak near D=0.6 cm, which illustrates that the tube diameter at which the greatest force density can be achieved. In a real system, cylinders can only be close packed to overall density of 78%, so there is a slight advantage to using a single McKibbons actuator. However, as seen in the figure, this 22% difference is small when compared with the improvement in force density from using multiple cylinders. When compared with a single actuator with a 4 cm diameter, the BoMA approach with multiple 0.6 cm diameter actuators more than doubles the potential force density.

Hydraulics also enables important advantages for replicating the principle of co-contraction in biarticulate, flexor/extensor muscle groups. Co-contraction has been shown to perform multiple functions in humans and animals, including a reduction of variability in reaching movements through increased stiffness produced by muscle activation and robustness to perturbations and an increase in joint impedance for greater limb stability, the quick generation of torque, and compensation for torque components orthogonal to desired trajectories.

In the BoMA approach, the stiffness inherent to the incompressible hydraulic fluid allows for precise control of a manipulator or leg through co-activation; for example, differences in simultaneous agonist (biceps brachii) contraction and antagonist (triceps brachii) contraction determine the position of the forearm. Isometric force can be determined by summing antagonist muscle torques; stiffness and torque can thus be controlled independently. This stiffness can be dynamically increased or decreased according to task requirements; greater stiffness allows for more precise control, while decreased stiffness enables more compliance. Additionally, the parallel elastic element in musculature acts as a lightly damped, non-linear spring which is the primary source for the passive tension (i.e., compliance) under eccentric loads which facilitates the contractile element's return to resting length. The elastic sheath of the fibers will provide some of this passive tension.

Hydraulics will inherently provide the remainder of damping using valves with adjustable orifices to produce a damping force proportional to the speed of movement. Since the biological tendon may contribute a great portion of compliance and therefore affect stiffness during locomotion, elasticity should be adjustable. Such stiffness will need to be counterbalanced with sufficiently high-bandwidth active and passive compliance to provide robustness to collisions and to maximize safety around humans. Thus, a key design characteristic of the BoMA approach is a range of compliance in both spring and damping characteristics. Approaches to compliance can be divided into two categories: passive and active. Passive approaches use the natural characteristics of materials to achieve spring and damping effects. Active compliance, on the other hand, is achieved by moving the actuator in a way that mimics a desired compliance.

Previously developed active approaches, such as the Series-Elastic Actuator use an actuator and tight control loop to mimic compliance of passive materials. In this approach, basic compliance is achieved through placement of spring between actuator and load; a linear potentiometer used to measure the spring's length provides force sensing that is combined with position sensors to facilitate rapid adjustments for desired position, velocity, springiness and damping gains. The series-elastic principle can be implemented using a hydraulic actuator that features low impedance and backdriveability; accordingly, the BoMA approach will be backdriveable.

For the BoMA approach, passive compliance is achieved through a number of means, including: the natural elasticity of the contractile sheath of the BoMA fibers, which provides a small restoring force back to resting length; through the elastic "tendons" arranged in series with the BoMA clusters, connecting them to the robot skeleton; through co-contraction control policies using adjustable stiffness; and through scalable actuation of individual fibers within clusters, exploiting the compliance of the surrounding unpressurized actuator material.

The inventors recognized that longer activation elements 10 typically have longer retraction lengths. For example, a longer activation element 10 having a nominal length of three feet (i.e., the length of the activation element 10 when not subjected to any pressures, such as a hydraulic activation fluid) may retract up to four inches when actuated. In contrast, a shorter activation element 10 having a nominal length of two feet may retract up to 3 inches when actuated. Many applications can benefit from the increased retraction of the longer activation element 10.

Undesirably, however, many applications have a limited amount of space to mount their activation element 10. Such applications therefore may not have the ability to retract as much as is optimally necessary. For example, a prior art robotic arm may be formed from two one-foot long members connected at a joint. Accordingly, use of an activation element 10 having a length of more than about two feet is not expected to be feasible.

After identifying this problem, the inventors discovered a way of taking advantage of the beneficial increased retraction of longer activation elements 10 within a smaller mounting region. For example, the inventors discovered that they could use an activation element 10 having a nominal length of three feet, four feet, or larger on the above noted exemplary prior art robotic arm formed from two one-foot members. Using these techniques, the inventors now have more aggregate and fine tuning control of two members that move relative to each other.

Figure 8A:
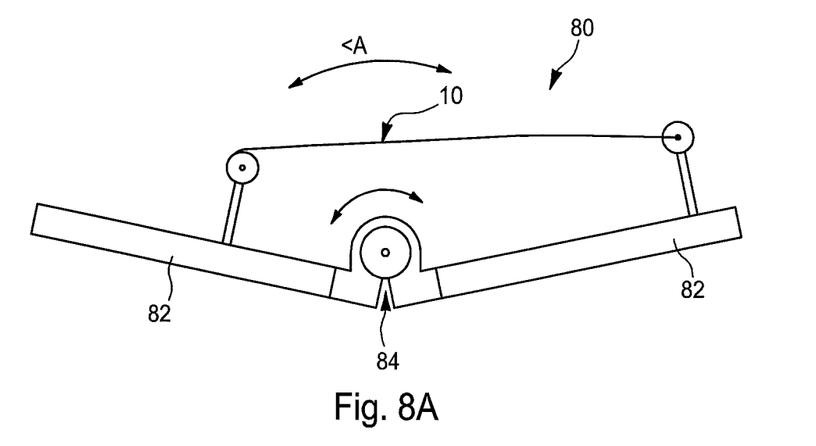
FIG. 8A schematically shows one implementation of a wrapped activation element in an extended position in accordance with illustrative embodiments of the invention.

To that end, FIG. 8A schematically shows a robotic arm 82 implementing illustrative embodiments of the invention. It should be noted that discussion of a robotic arm 82 is but one of many potential applications of various embodiments. For example, illustrative embodiments can apply to two members 82 that are not even connected to each other, or connected to each other in some other manner. Accordingly, discussion of a robotic arm 82 is merely to simplify this discussion and thus, not intended to limit various embodiments invention.

The robotic arm 82 in this embodiment is formed primarily from two members 82 that are pivotably connected to each other at a joint 84. In this case, both members 82 connect with the joint 84 at one of their respective ends. Among other things, the joint 84 may include a hinge or other conventional joint for facilitating rotational movement. Some embodiments may provide a spring that normally biases the two members 82 apart, while other embodiments may omit a bias.

The robotic arm 82 also has an activation element 10 extending between the two members 82 for controlling rotational movement about the joint 84. In accordance with illustrative embodiments of the invention, to permit use of longer nominal activation elements 10, rather than being anchored at its end, the activation element 10 is wrapped about at least a portion of one of the members 82. The other end of the activation element 10 also may be wrapped about the other member 82, or anchored to its member 82. FIG. 8A schematically shows these connection points (one wrapped, the other anchored) at connection members 86 (also referred to as "posts 86") extending upwardly from the main surfaces of the members 82. Although the connection members 86 are shown as extending from the main surface of their members 82, they may be flush with the main surface of the member 82, or even recessed into the main surface of the member 82. Alternatively, in some embodiments, the wrapped end may be wrapped about the main surface of the member 82. During experiments, the inventors discovered that that the members 82 received the benefit of the greater retraction ability of longer nominal activation elements 10 despite the fact that the distance between the two connection points of the activation element 10 (even at their greatest linear distance) was less than nominal length of the activation element 10.

Figure 8B:
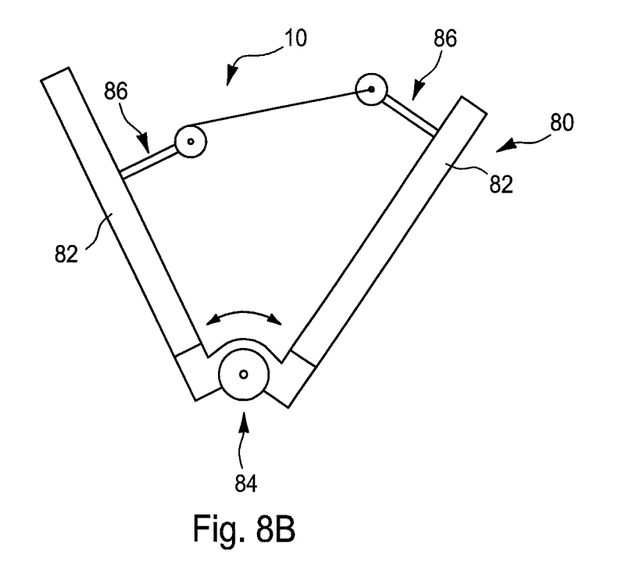
FIG. 8B schematically shows the implementation of FIG. 8A in a retracted position in accordance with illustrative embodiments of the invention.

FIG. 8A therefore schematically shows the robotic arm 82 in an extended position when the activation element 10 is not actuated or only somewhat actuated. In fact, some embodiments may permit the two members 82 to extend even farther, permitting Angle A of FIG. 8A to extend to 180 degrees or beyond as the activation element 10 moves toward its nominal, un-actuated state. To contrast FIG. 8A, FIG. 8B schematically shows the same robotic arm 82 in a more retracted position. As such, the activation element 10 has been actuated, shortening its length. Of course, those skilled in the art can retract as far as necessary.

It should be reiterated that as schematic drawings, the joint 84, members 82, and their connection members 86 are not drawn to scale. In fact, as noted above, some implementations may space the activation element 10 very close to the main surfaces of their members 82 and thus, the relatively far spacing shown in the figures is primarily for easy descriptive purposes. In addition, the connection points to the members 82 can be at any point along their lengths. Accordingly, the positions in the figures are merely illustrative.

Figure 9:
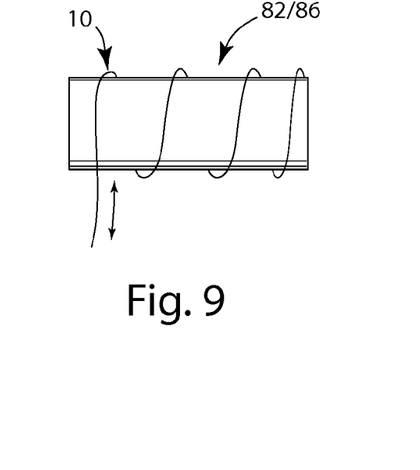
FIG. 9 schematically shows one way of wrapping an activation element in accordance with illustrative embodiments of the invention.

The end of the activation element 10 can be wrapped about the member 82 in any of a number of different manners. FIG. 9 schematically shows one way, in which the activation element 10 is wrapped multiple times about a cylindrically-shaped portion or portion having another shape. As such, the activation element 10 is wrapped more than 360 degrees around the member 82. Some embodiments, however, may wrap the activation element 10 less than 360 degrees around the member 82. In either case, the end of the activation element 10 may form a full or partial loop, of any shape (e.g., circular or non-circular), about the member 82. Those skilled in the art can wrap the activation element 10 about the member 82 in any of a variety of different manners, including in a random fashion, or in a carefully prescribed fashion.

Figure 4:
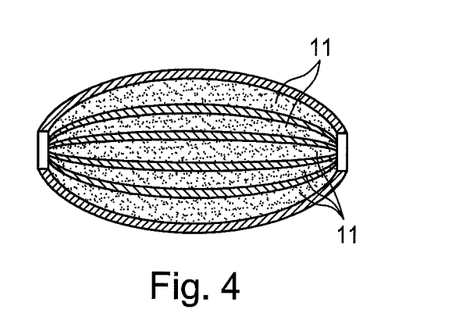
Figure 5:
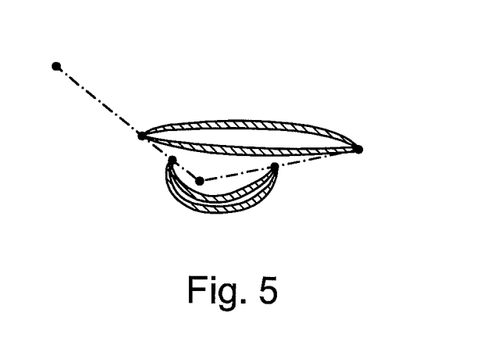
FIG. 5 is a semi-schematic view of one embodiment of the present invention illustrating one potential use of the activation elements.

Moreover, when wrapped around the member 82, the internal channel (e.g., internal channels 11 shown in FIG. 4) of the activation element 10 preferably remains open (i.e., in an open state) to receive actuation fluid, such as hydraulic fluid or pneumatic fluid. In other words, that internal fluid channel does not collapse when wrapped around the member 82. Other embodiments, however, may collapse that internal channel.

Figure 10A:
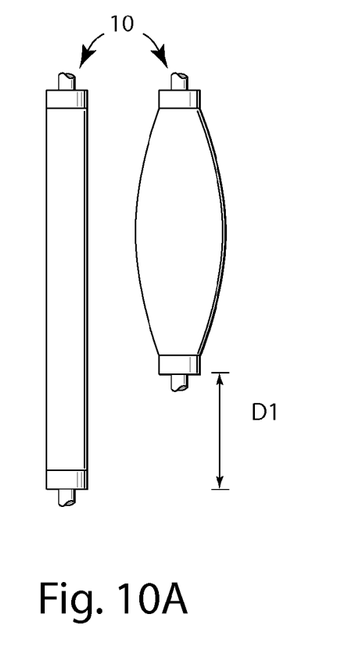
FIG. 10A schematically shows a first activation element both in a nominal state and in an activated state.
Figure 10B:
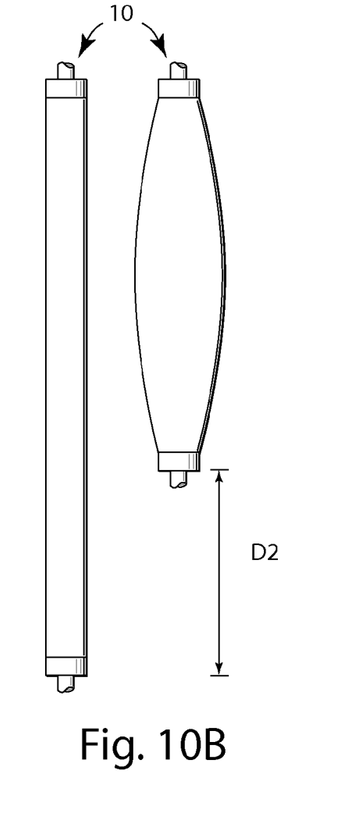
FIG. 10B schematically shows a second activation element both in a nominal state and in an activated state.

FIGS. 10A and 10B demonstrate the increased retraction ability of a longer activation element 10. Specifically, FIG. 10A schematically shows a shorter activation element 10 having a maximum retraction length of distance D1, while FIG. 10B schematically shows a longer activation element 10 having a maximum retraction length of distance D2. As shown, distance D2 is greater than distance D1. As noted above, various embodiments take advantage of all or part of the longer retraction distance D2 by wrapping it about one or both members 82.

For example, the shorter element may have a nominal length of two feet, while the longer activation element 10 may have a nominal length of three feet. In a corresponding manner, the shorter element may have a maximum retraction distance D1 of two inches, while the longer element may have a maximum retraction distance D2 of three inches. In accordance illustrative embodiments of the invention, the longer element may be mounted between the two members 82 and have the capacity of retracting more than the retraction distance D1. In fact, this improved retraction should occur even when the maximum linear distance between the two points of connection between the members 82 (i.e., when angle A is 180 degrees) is the same as the nominal length of the shorter activation element 10.

Figure 11:
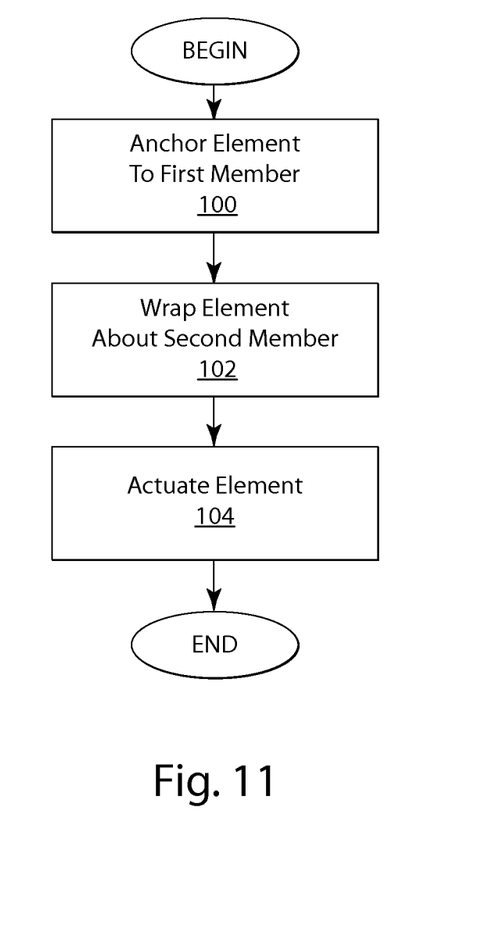
FIG. 11 shows a process of forming and using an activation element in accordance with illustrative embodiments of the invention.

FIG. 11 shows a process of forming and using the robotic arm 82 in accordance with illustrative embodiments of the invention. The process begins at step 100, which anchors the activation element 10 to a first of the two members 82. In this case, one end of the activation element 10 is simply bolted or otherwise secured to the connecting member 86 of the first member 82. The other end, however, may be wrapped about the second member 82 as discussed above (step 102). At this point, the activation element 10 should be fully connected with the robotic arm 82. The outer braided sheath of the activation element 10, which encompasses its internal elastic tubular member and limits its expansion, may have its braids somewhat more compressed than normal. Other embodiments may permit the braids to have normal braid compression, or even less compression than normal (i.e., somewhat expanded).

The process concludes at step 104, which actuates the activation element 10 with an actuation fluid (e.g., liquid or air). This should shorten the activation element 10, causing the members 82 to pivot relative to one another to reduce the angle A.

As noted above, in some embodiments, the activation element 10 includes only a single element. In other embodiments, however, the activation element 10 includes a plurality of independent activation elements 10 in the form of a bundle. Each of these activation elements 10 can be independently activated and controlled as needed to at least vary the power output of the bundle by selectively activating and controlling a desired number of elements. Moreover, other embodiments may have one or more other activation elements 10 that rotate the members 82 in an opposite direction to that of the activation element 10 shown.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. An apparatus, comprising:
   a first member;
   a second member that is movable relative to the first member; and
   a hydraulic muscle element configured to move the second member relative to the first member, the hydraulic muscle element extending longitudinally between a first element end and a second element end;
   wherein the hydraulic muscle element at the first element end is connected to the first member;
   wherein the hydraulic muscle element is connected to the second member, and an end portion of the hydraulic muscle element at the second element end is wrapped about at least a portion of the second member; and
   wherein an intermediate portion of the hydraulic muscle element is not wrapped around the first member or the second member.

2. The apparatus of claim 1, wherein a longitudinal length of the end portion of the hydraulic muscle element changes as the second member moves relative to the first member.

3. The apparatus of claim 2, wherein an effective force output of the hydraulic muscle element changes as the longitudinal length of the end portion of the hydraulic muscle element changes.

4. The apparatus of claim 1, wherein
   the hydraulic muscle element has an internal channel for receiving hydraulic fluid; and
   at least a portion of the internal channel is within the end portion of the hydraulic muscle element and is substantially collapsed.

5. The apparatus of claim 1, wherein
   the hydraulic muscle element has an internal channel for receiving hydraulic fluid; and
   at least a portion of the internal channel is within the end portion of the hydraulic muscle element and is open and operable to receive the hydraulic fluid.

6. The apparatus of claim 1, wherein the end portion of the hydraulic muscle element is wrapped at least three-hundred and sixty degrees around the second member.

7. The apparatus of claim 1, wherein the end portion of the hydraulic muscle element is wrapped less than three-hundred and sixty degrees about the second member.

8. The apparatus of claim 1, wherein the wrapping of the end portion of the hydraulic muscle element about the at least a portion of the second member secures the hydraulic muscle element to the second member.

9. The apparatus of claim 1, wherein the hydraulic muscle element has a nominal length when at rest, the hydraulic muscle element being connected to the first member at a first location, the hydraulic muscle element being wrapped about the second member at a second location, the first location being spaced a given distance from the second location, and the given distance being less than the nominal length of the hydraulic muscle element.

10. The apparatus of claim 1, further comprising a joint between the first member and the second member, wherein the joint is configured to permit the first member to pivot about the joint relative to the second member.

11. The apparatus of claim 10, wherein the joint comprises a hinge.

12. The apparatus of claim 1, wherein the hydraulic muscle element comprises an internal elastic element and an outer sheath that limits the expansion of the internal elastic element.

13. The apparatus of claim 12, wherein the outer sheath comprises a braided element.

14. The apparatus of claim 1, wherein an end portion of the hydraulic muscle element at the first element end is wrapped about the first member.

15. The apparatus of claim 1, wherein the first element end of the activation element is anchored to the first member.

16. The apparatus of claim 1, wherein the second member has a post, and the end portion of the hydraulic muscle element is wrapped about the post.

17. The apparatus of claim 1, wherein the hydraulic muscle element comprises a plurality of independent hydraulic activation elements in a bundle.

18. The apparatus of claim 17, wherein the plurality of independent hydraulic activation elements are operable to be independently activated and controlled to at least vary a power output of the bundle by selectively activating and controlling a select number of elements.

\* \* \* \* \*